(No Model.)
W. H. LEWIS.
PHOTOGRAPHIC CAMERA SHUTTER.
No. 510,805. Patented Dec. 12, 1893.
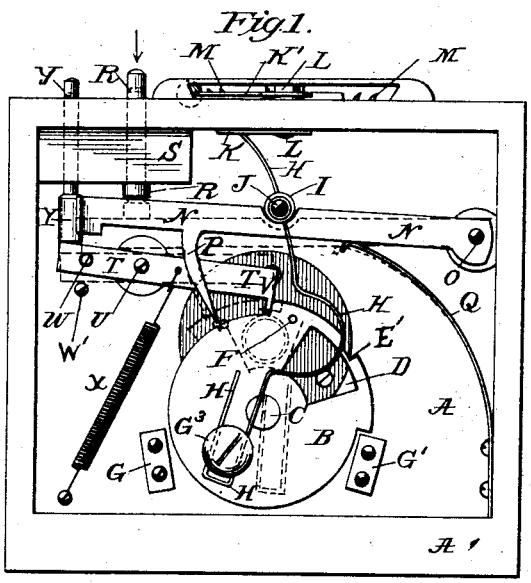
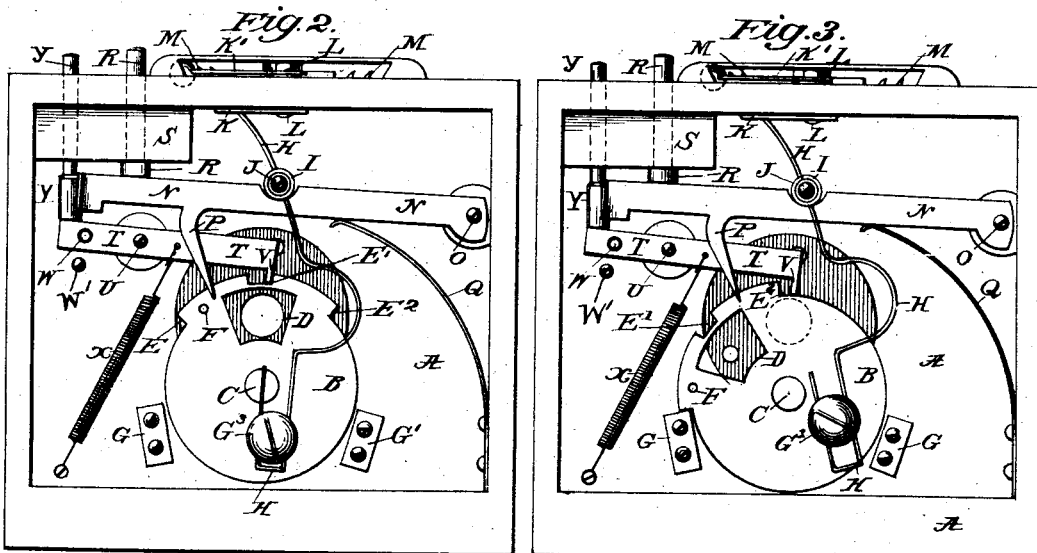
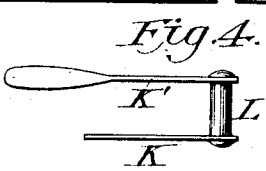
WITNESSES:
Edward C. Rowland.
E. Simpson.
INVENTOR
William H. Lewis
BY Phillips Abbott
ATTORNEY

UNITED STATES PATENT OFFICE.

WILLIAM H. LEWIS, OF HUNTINGTON, ASSIGNOR TO THE E. & H. T. ANTHONY & COMPANY, OF NEW YORK, N. Y.

PHOTOGRAPHIC-CAMERA SHUTTER.

SPECIFICATION forming part of Letters Patent No. 510,805, dated December 12, 1893.

Application filed August 29, 1893. Serial No. 484,342. (No model.)

*To all whom it may concern:*

Be it known that I, WILLIAM H. LEWIS, a citizen of the United States, and a resident of Huntington, in the county of Suffolk and State of New York, have invented certain new and useful Improvements in Photographic Shutters, of which the following is a specification.

My invention relates to improvements in shutters for photographic cameras, and it consists in the construction, combination, and arrangement of the parts as hereinafter set forth, whereby I secure great simplicity and durability of the device, and ease and reduced cost in manufacture.

In the drawings: Figure 1, illustrates a rear view of the shutter, the parts being shown in full lines as they are when set and ready for an exposure, and the dotted lines show the position of the parts during the time that the horn of the time exposure lever engages with the stop pin on the shutter. Fig. 2, illustrates the position of the parts after the time exposure lever has been released and the shutter is held at "time" by the pawl of the instantaneous lever, so-called. Fig. 3, illustrates the position of the parts after an exposure has been made and before the resetting of the spring *i. e.*, its reversal for another exposure. Fig. 4 illustrates a detail of the double lever which puts the motor spring under tension.

A is the frame or base board of the shutter.

B is the shutter. It is pivoted centrally, at C.

D is the exposure aperture in the shutter.

The upper edge of the shutter is provided with three detents or stops, E, E' and $E^2$, as shown. They may be differently constructed, if preferred.

F is a stop pin, fastened to the shutter.

G, G' are two stops on the casing, which limit the rotation of the shutter in both directions.

$G^3$ is a button, preferably having a large overlapping head, as shown; the shank of the button is fastened to the shutter.

H is the spring which acts as the motor for the shutter. It is preferably given the shape shown or an equivalent elongation, so that its elasticity and resiliency may be increased. It is fastened to a sleeve I, which turns on a pin J, so that it is in effect pivoted between its engagement with the button on the shutter, and its engagement with the lever K, which puts it under tension. The lever K has two arms parallel with each other, one K, as shown, being inside of the shutter case, and the other K', outside thereof, and they are not only rigidly attached to each other, but are pivoted at L to the shutter case, and the part which is outside of the shutter case is extended into a little handle, and is made to engage with a rack M on the case, in a manner well-known, in order to put the spring under different degrees of tension. These parts are now so well understood, that further description of them is unnecessary.

N is what I term the "time exposure" lever, because by its manipulation, the time exposures are secured. It is pivoted at O to the shutter case, and is provided with a downwardly extending horn P, and a spring Q, which normally throws it upwardly.

R is a tripping push button and spindle, which projects through a guide block S and the side of the shutter case and extends beyond it, so as to be easily depressed by the finger of the operator.

T is what I term the "instantaneous exposure" lever. It is pivoted at U, and is provided on one end with a pawl V and has a pin W, so located as to be engaged by the free end of the time exposure lever.

W' is a pin on the case which limits the movement of the lever T.

X is a spring which normally draws the free end of the instantaneous lever downwardly so that the pawl V, on its end engages with the detents on the shutter.

Y is the pressure button and spindle for the instantaneous exposure lever.

The operation of the apparatus is as follows: The tension lever is thrown over and engaged in the desired tooth of the rack, thus putting the motor spring under tension, and as shown in Fig. 1, in full lines, the shutter is held by the pawl V on the lever T, against the stress of the spring. To make now an instantaneous exposure, the push button Y is depressed, the lever T is rocked on its pivot U, and the pawl is lifted out from the detent in which it rested, and the spring H, thereupon immediately throws the shutter over, and in its transit, the exposure aperture D, in the shutter, is carried across the open end of the lens tube. To make another instantaneous exposure, the tension lever K' is thrown over in the opposite direction and engaged with the right hand end of the rack. The pawl V will then engage with the detent E² on the shutter, and hold it against movement in that direction. The exposure is then made by a mere repetition of the movements before described, but in the reverse direction, in part. To make a "time" exposure, the push button R is depressed, which carries down the time exposure lever N, and when it has descended a certain distance, its free end comes in contact with the pin W, on the instantaneous lever T. Consequently, that lever also is depressed, whereby the pawl V is removed from the detent E or E², whichever it happens to be engaged with. Thereupon the shutter is oscillated by the tension spring H, but its movement is arrested when the exposure aperture D comes coincident with the lens tube by the engagement of the horn P with the stop pin F on the shutter. Thus a time exposure is secured, and it can be maintained either by continuing the pressure on the button R, or that pressure being released, the levers N and T will both rise in such manner, that the pawl of the lever T will engage with the medial detent E' on the shutter, before the horn on the time lever has freed the pin on the shutter; thus the pawl on the lever T will hold the shutter indefinitely at "time exposure." Then either of the push buttons may be depressed, which will release the shutter, and it will immediately complete its transit and the camera will be closed.

I claim—

The combination in a shutter mechanism of an oscillating shutter, a reversible spring to throw the shutter, a lever which engages with the spring within the shutter case, a handle on the outside of the shutter case attached to the lever and a rack on the outside of the case, with which the handle engages, detents on the shutter, a stop on the shutter, a lever, which engages with said detents, and another lever, provided with a horn, which, being depressed, engages with the first named lever, and the horn whereof passes into a position to be engaged by said stop on the shutter, substantially as set forth.

Signed at New York, in the county of New York and State of New York, this 24th day of August, A. D. 1893.

WILLIAM H. LEWIS.

Witnesses:
PHILLIPS ABBOTT,
E. SIMPSON.